(12) United States Patent
Kapusky (10) Patent No.: US 11,167,664 B2
(45) Date of Patent: Nov. 9, 2021

(54) SAFETY DEVICE

(71) Applicant: Adient Engineering and IP GmbH, Burscheid (DE)

(72) Inventor: Michael J. Kapusky, South Lyon, MI (US)

(73) Assignee: Adient Engineering and IP GmbH, Burscheid (DE)

( * ) Notice: Subject to any disclaimer, the term of this patent is extended or adjusted under 35 U.S.C. 154(b) by 0 days.

(21) Appl. No.: 16/843,184

(22) Filed: Apr. 8, 2020

(65) Prior Publication Data

US 2021/0316640 A1  Oct. 14, 2021

(51) Int. Cl.
*B60N 2/00* (2006.01)
*B60N 2/08* (2006.01)
*B60N 2/07* (2006.01)

(52) U.S. Cl.
CPC ............. *B60N 2/08* (2013.01); *B60N 2/0732* (2013.01)

(58) Field of Classification Search
None
See application file for complete search history.

(56) References Cited

U.S. PATENT DOCUMENTS

| | | | |
|---|---|---|---|
| 3,874,480 A | 4/1975 | Porter et al. | |
| 8,079,279 B2* | 12/2011 | Brechelente | B23Q 5/408 74/89.39 |
| 8,820,694 B2* | 9/2014 | Tarusawa | B60N 2/067 248/430 |
| 9,056,559 B2* | 6/2015 | Thuleau | B60N 2/0705 |
| 2004/0206878 A1* | 10/2004 | Borbe | B60N 2/067 248/424 |
| 2006/0237987 A1* | 10/2006 | Nakamura | B60N 2/067 296/65.13 |
| 2007/0096494 A1* | 5/2007 | Hofschulte | B60N 2/0705 296/65.01 |
| 2018/0304777 A1* | 10/2018 | Ito | B60N 2/067 |

\* cited by examiner

*Primary Examiner* — Steven M Marsh
(74) *Attorney, Agent, or Firm* — Marshall & Melhorn, LLC (57) ABSTRACT

A safety device for a lock mechanism may have a housing that encapsulates the lock mechanism. The housing may have at least one opening, through which at least one adjustment element coupled to the lock mechanism is guidable. The at least one opening may have a sealing element. A seat track for a seat is also disclosed. The seat track may have a first track assembly with at least one track member, a second track assembly with at least one further track member, and a lock mechanism configured to lock an adjustment of the seat.

13 Claims, 8 Drawing Sheets

SAFETY DEVICE

BACKGROUND OF THE DISCLOSURE

The present disclosure relates generally to a safety device for a lock mechanism.

Lock mechanisms are well known in the state of art and may be used in adjustable vehicle seats. For example, one or more lock mechanism is used for locking an elevation and/or tilting of an angle of the seat and/or for locking the seat on rails so that the seat slide backwards or forwards until a required position is reached. One example of such a lock is disclosed in U.S. Pat. No. 3,874,480 A.

SUMMARY OF THE DISCLOSURE

It is an object of the present disclosure to provide a safety device for a lock mechanism that enables protection of the lock mechanism against environmental influences, in particular dirt, mud and dust.

The object is achieved by a safety device according to claim 1 and by a seat track according to claim 11.

According to the disclosure, a safety device for a lock mechanism comprises a housing containing the lock mechanism, wherein the housing comprises at least one opening, through which at least one adjustment element coupled to the lock mechanism is guidable and wherein the at least one opening comprises a sealing element.

The safety device enables a protective encapsulation, e.g. sealing, of the lock mechanism in order to minimize reduction of function due to environmental influences, e. g. dirt, mud and dust. This may be of particular advantage if the lock mechanism refers to a vehicle seat track and/or vehicle seat recliner of a manufacture open side-by-side all-terrain vehicle (ATV). Such vehicles can get buried in water and mud during usage so that the vehicle seat including the lock mechanism can get completely contaminated. The safety device protects the lock mechanism against such contamination.

The safety device may be alternatively used for a lock mechanism of a vehicle seat recliner. Moreover, the safety device may be used for any lock mechanism without limitation for use in a vehicle seat or vehicle.

The housing may be two-parted and comprise for instance at least a cap shell and a bottom shell engaged to each other in an interlocking and/or force-fitting manner. A two parted housing enables mounting of the lock mechanism inside the safety device.

In an exemplary embodiment, the engaging area between the cap shell and bottom shell is sealed by a circumferential sealing in order to seal an inside of the housing.

The cap shell and bottom may each comprise a circumferential groove on their edge configured to receive the circumferential sealing.

In an exemplary embodiment, the cap shell is configured as a cover and comprises a number of slots through which fixing elements of the lock mechanism are guidable. The lock mechanism may be thus sealingly coupled to a seat track by the safety device. In particular, the safety device, e.g. the housing, encapsulates the lock mechanism in its assembled position to a track or a recliner.

Furthermore, the bottom shell may be configured shell-like and comprises the at least one opening. The bottom shell may comprise a further opening on a side wall, through which a releasing element that is configured to release the lock mechanism is guidable.

In an exemplary embodiment, the openings are respectively sealed by the sealing element. The slots in the cap shell may be sealed as well by a sealing element. For example, the sealing element is a seal ring, i. e. an O-ring.

Moreover, the housing may be made from a stainless metal. This enables protection of the lock mechanism inside the housing.

According to the disclosure, a seat track assembly for a seat comprises a first track assembly with at least one track member, a second track assembly with at least one further track member, a lock mechanism configured to lock an adjustment of the seat and a safety device. In particular the lock mechanism is configured to lock at least one of the track member e.g. by friction.

The safety device may be used for a lock mechanism of a vehicle seat track comprising at least one linear lock device offering an infinite adjustment of the vehicle seat in a forward and backward direction. To that the vehicle seat track comprises two rods, whereby the lock device is used to lock the seat on these rods. The linear lock device may have torsional springs engaged to the rods in order to lock the seat in a required position.

Furthermore, the lock mechanism may comprise at least one lock device and at least one bearing element each contained in the housing. The bearing element is configured to enable an adjustment of the vehicle seat with low effort. The bearing element may be contained in the housing of the safety device in community with the linear lock device. Particularly, the bearing element may be mounted on an end side of the lock device.

In an exemplary embodiment, the track member of the second seat track assembly is configured as a rod that is guided through the at least one opening in the housing of the safety device.

BRIEF DESCRIPTION OF THE DRAWINGS

The present disclosure will become more fully understood from the detailed description given herein below and the accompanying drawings which are given by way of illustration only, and thus, are not limitative of the present disclosure, wherein.

Corresponding parts are marked with the same reference symbols in all figures.

DETAILED DESCRIPTION OF PREFERRED EMBODIMENTS

Figure 1:
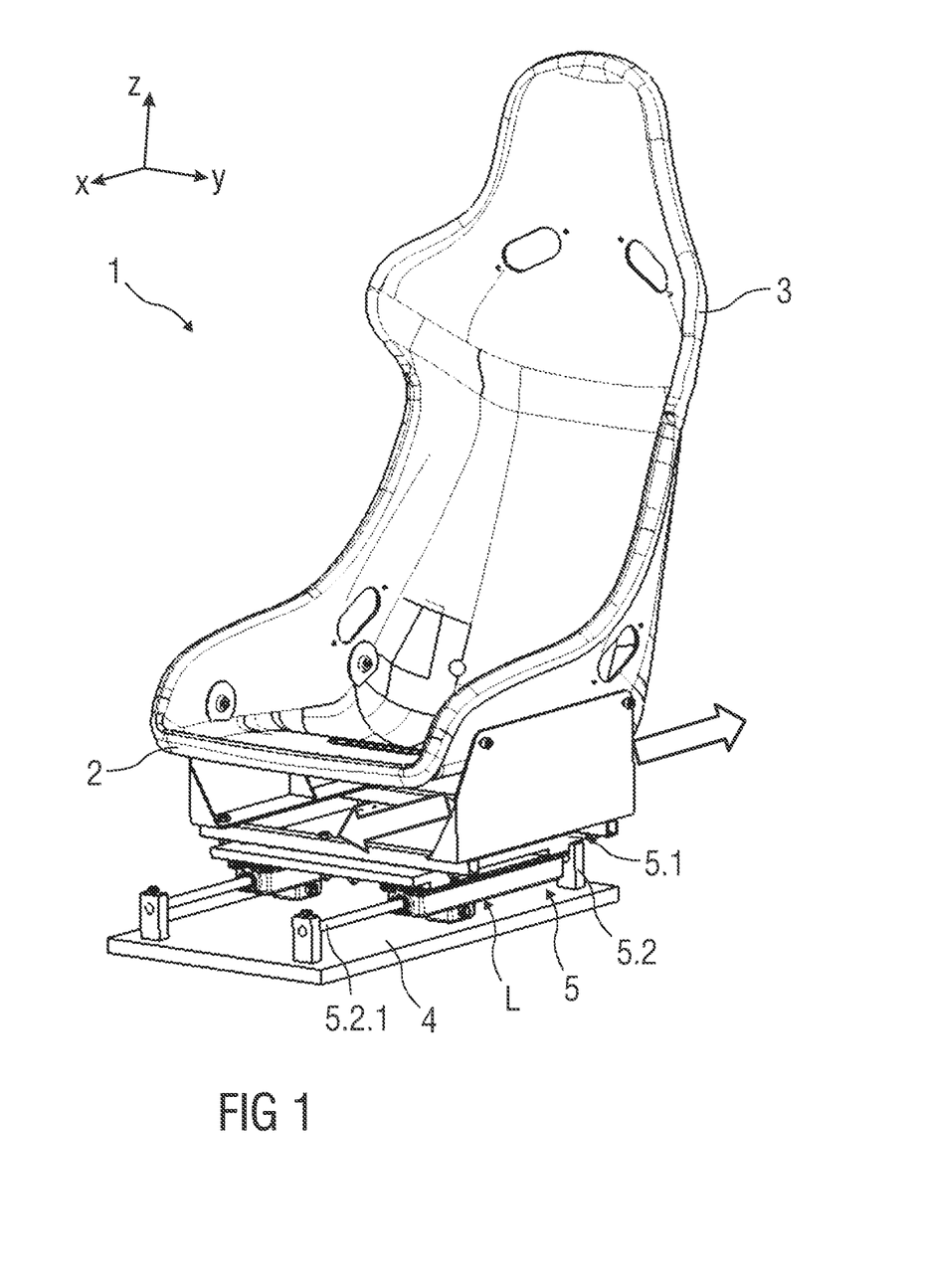
FIG. 1 shows a perspective view of an exemplary embodiment of a seat, in particular vehicle seat.
Figure 2:
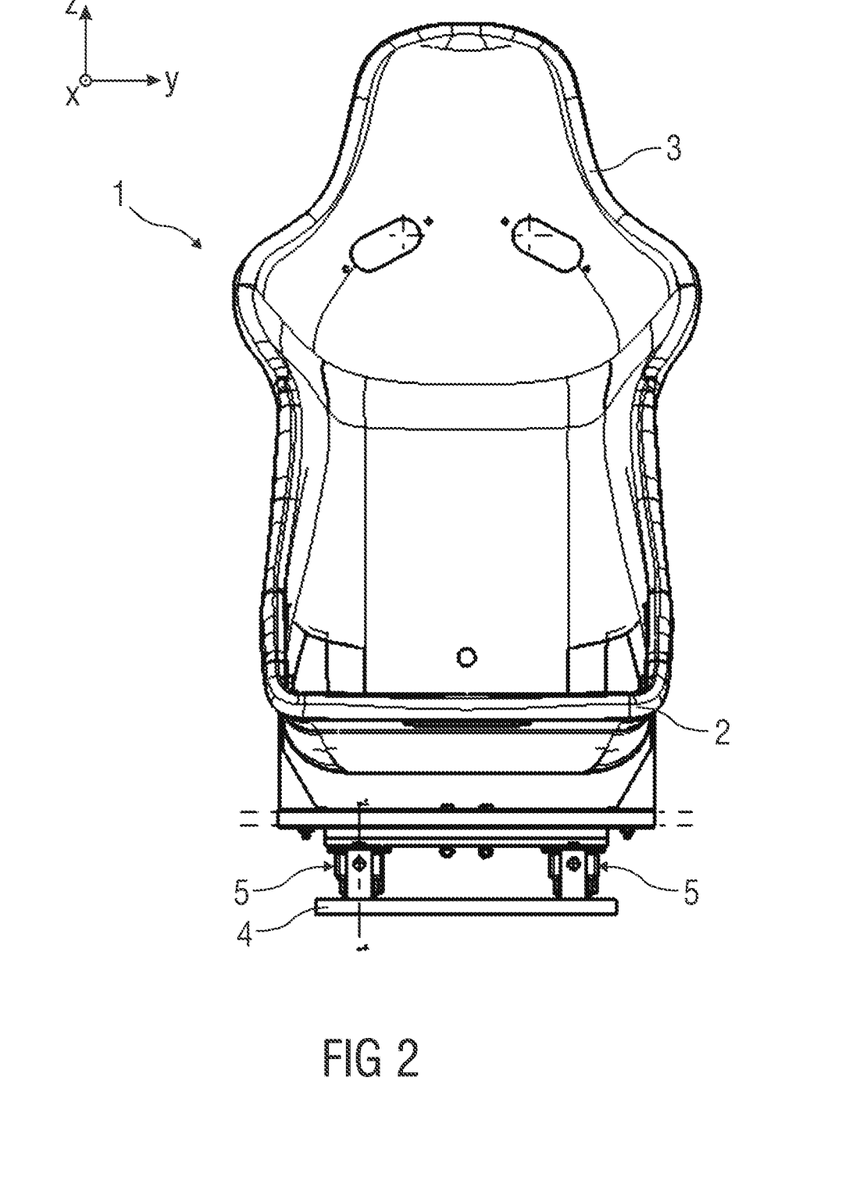
FIG. 2 shows a front view of an exemplary embodiment of a seat.
Figure 3:
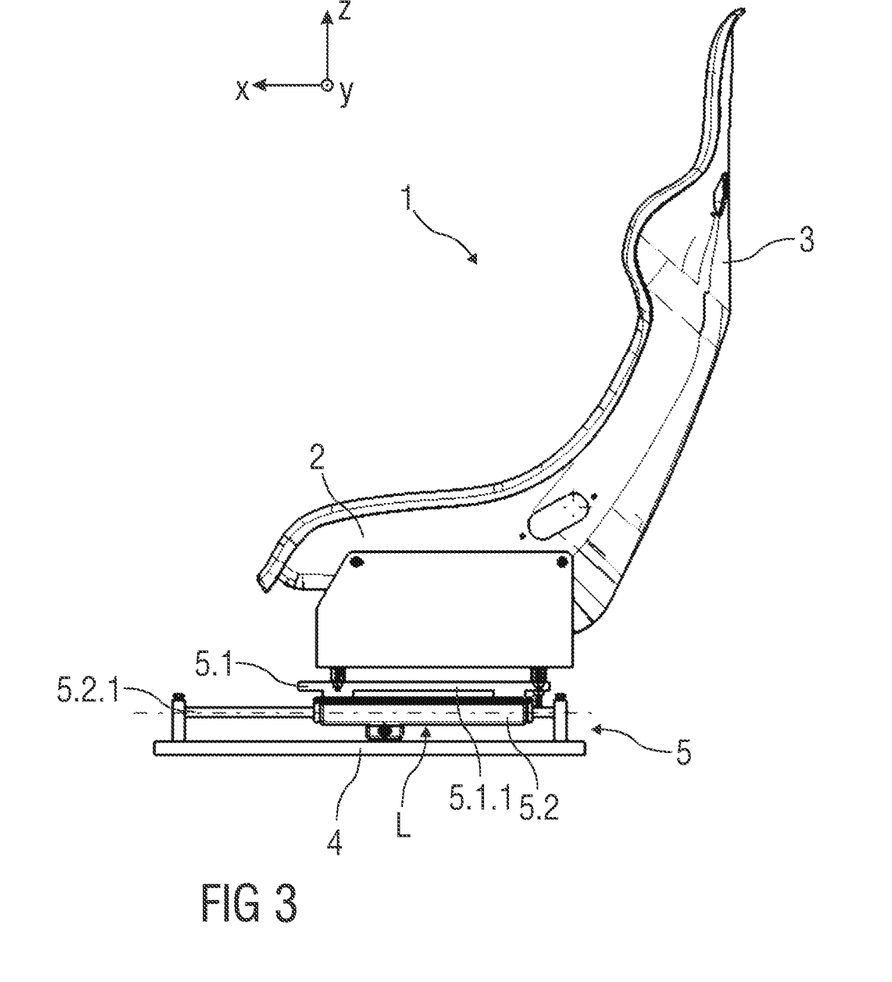
FIG. 3 shows a side view of an exemplary embodiment of a seat.

FIGS. 1 to 3 show a perspective view of an exemplary embodiment of a seat 1, in particular a vehicle seat.

For a better understanding of subsequent descriptions of the seat 1 a coordinate system is shown in further figures. The coordinate system comprises a longitudinal axis x, a transverse axis y and a vertical axis z.

The seat 1 comprises a seat pan 2, a backrest 3 and a seat base 4. The backrest 3 may be adjustable relatively to the seat pan 2. In particular, the backrest 3 may be pivotably connected to the seat pan 2 by a recliner mechanism comprising recliner fittings (not shown) or may be fixed relative thereto. The seat base 4 is fixed to a floor, in particular a vehicle floor.

The seat 1 further comprises a seat track 5 through which the seat 1 may be coupled to the vehicle. The seat track 5 is configured to allow a seat occupant to selectively adjust the position of the seat 1 in a translational manner along the longitudinal axis x (shown by the arrows in FIG. 1). For example, the seat track 5 may be arranged within the vehicle in a manner that enables a vehicle seat occupant to infinitely adjust the position of the seat 1 in a fore and aft direction with respect to the vehicle.

In an exemplary embodiment, the seat track 5 generally includes a first track assembly 5.1 and a second track assembly 5.2. The first track assembly 5.1 is configured to be affixed (formed, bolted, fastened, welded, or the like) to the seat 1, such as to a bottom of the seat pan 2, or the like. The second track assembly 5.2 is configured to be affixed (formed, bolted, fastened, welded, or the like) to the seat base 4. The seat track assemblies 5.1, 5.2 are configured to operatively cooperate with each other to enable the movement or translation of the seat 1 relative to the vehicle when a vehicle seat occupant actuates a lever or other actuator (not shown). The seat 1 comprises two pairs of seat tracks wherein the pairs of tracks are arranged on each lateral side of the seat pan 2.

The first track assembly 5.1 may comprise elongated track members 5.1.1 that are fixed to the seat pan 2. The second track assembly 5.2 comprises further elongated track members 5.2.1 that may be configured as hollow or solid rods and that are configured to be coupled to the seat base 4. The track members 5.1.1, 5.2.1 are slidably engaged to each other in order to enable the movement or translation of the seat 1 relative to the vehicle. One seat track member 5.1.1 slidably coupled to another seat track member 5.2.1 forms one of the pairs of seat tracks.

The seat track 5 further comprises a lock mechanism L that releasably retains the track members 5.1.1, 5.2.1 in a locked position relative to one another until the lock mechanism L is released. Once the lock mechanism L is released, the track members 5.1.1, 5.2.1 can be moved relative to one another e.g. by bowden cables, which enable the vehicle seat occupant to adjust the position of the seat 1 and to then re-engage or release the lock mechanism L to hold the seat 1 in the new position. In particular, the lock mechanism L is configured to enable infinitely adjustment of the seat 1.

Figure 4:
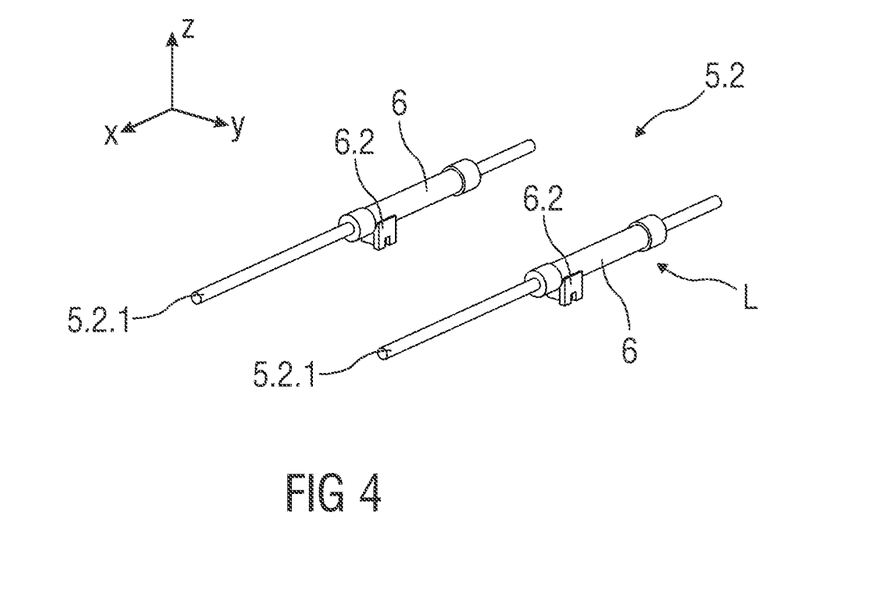
FIG. 4 shows a perspective view of an exemplary embodiment of a lock mechanism of a seat.

FIG. 4 shows a perspective view of an exemplary embodiment of the lock mechanism L.

The lock mechanism L may comprise two linear lock devices 6 each engaged to one further track member 5.2.1.

The two linear lock devices 6 can be coupled by a transmission component 6.1 for simultaneous release of the lock mechanism L, in particular the lock devices 6. The transmission component 6.1 is connected to the lock devices 6 via coupling elements 6.2 (shown in FIG. 4). The transmission component 6.1 can be actuated by a bowden cable (not shown). Alternatively, the linear lock devices 6 could be released directly by at least one actuation element (not shown) which is directly coupled to the coupling elements 6.2.

The coupling elements 6.3 can be also enclosed by the housing 8, e.g. by a separate housing part 8.2. Each of the housing parts 8.2 comprises exits 8.3 for a bowden cable or another suitable actuation element and/or the transmission component 6.1. All exits 8.3 are formed as openings. The exits 8.3 can be sealed with sealing elements 10.

For example, the linear lock devices 6 are respectively configured as a mechanical lock including a number of teeth that operatively engage gaps (not shown) in the other track member 5.1.1, whereby the seat 1 is locked in position when a teeth engages a gap. The mechanical lock may also be biased, such as by a spring or the like, towards a locked position. Alternatively, the lock mechanism L may comprise only one lock device 6 engaged to one of the track members 5.2.

Figure 10:
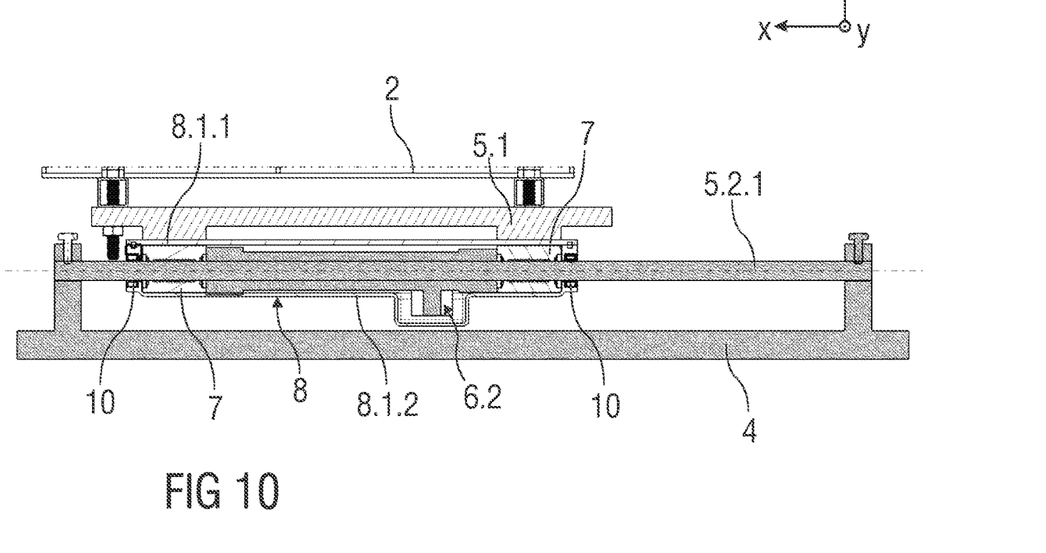
FIG. 10 shows a cut view of an exemplary embodiment of a seat track with a lock mechanism and a safety device and FIG. 11 shows a cut view of an enlarged section of FIG. 10 with a seat rod guided through an opening of the safety device.

The lock mechanism L further comprises at least one bearing element 7 (see e. g. FIG. 10) which is configured to reduce sliding effort. In particular, an occupant load from the seat 1 will not go into the lock mechanism L, but only in the bearing element 7. Referring to an exemplary embodiment, the bearing element 7 is configured as a linear bearing element, whereby on each end-side of the lock device 6 one bearing element 7 is mounted (see FIG. 6). Alternatively, slide blocks or pillow blocks are arranged as friction reducing components in order to reduce sliding effort.

The seat 1 may be arranged within a manufacture open side-by-side all-terrain vehicle (ATV). Such vehicles can get buried in water and mud during usage so that the vehicle seat including the lock mechanism can get completely contaminated. In order to protect the lock mechanism L against such contamination, a safety device 8 (see FIG. 5) is provided.

Figure 5:
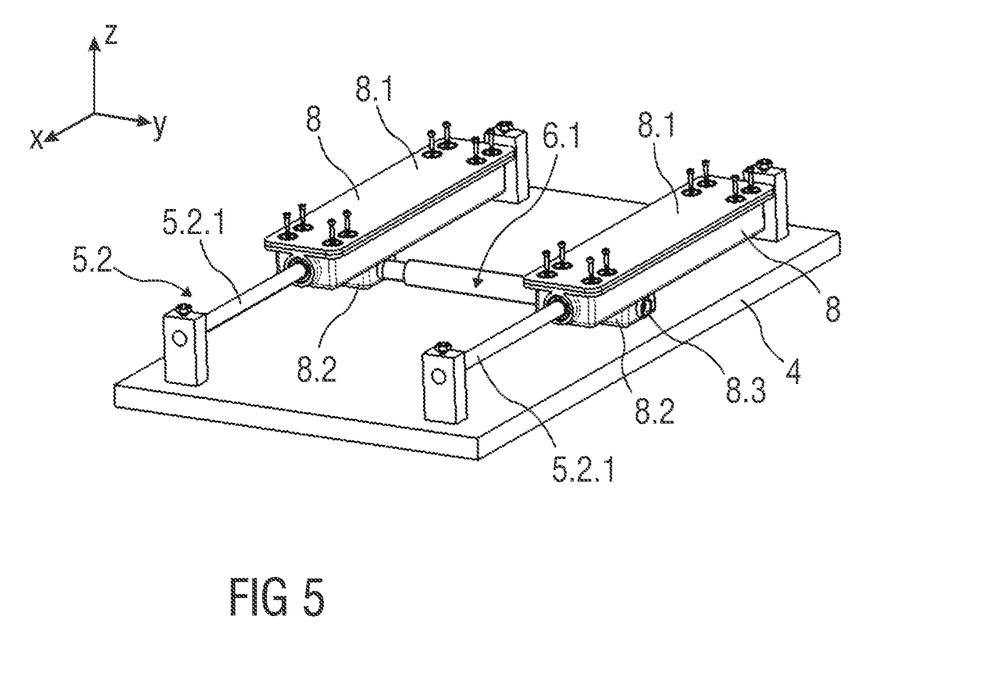
FIG. 5 shows a perspective view of an exemplary embodiment of a seat track with a lock mechanism and a safety device for the lock mechanism and a seat base.
Figure 6:
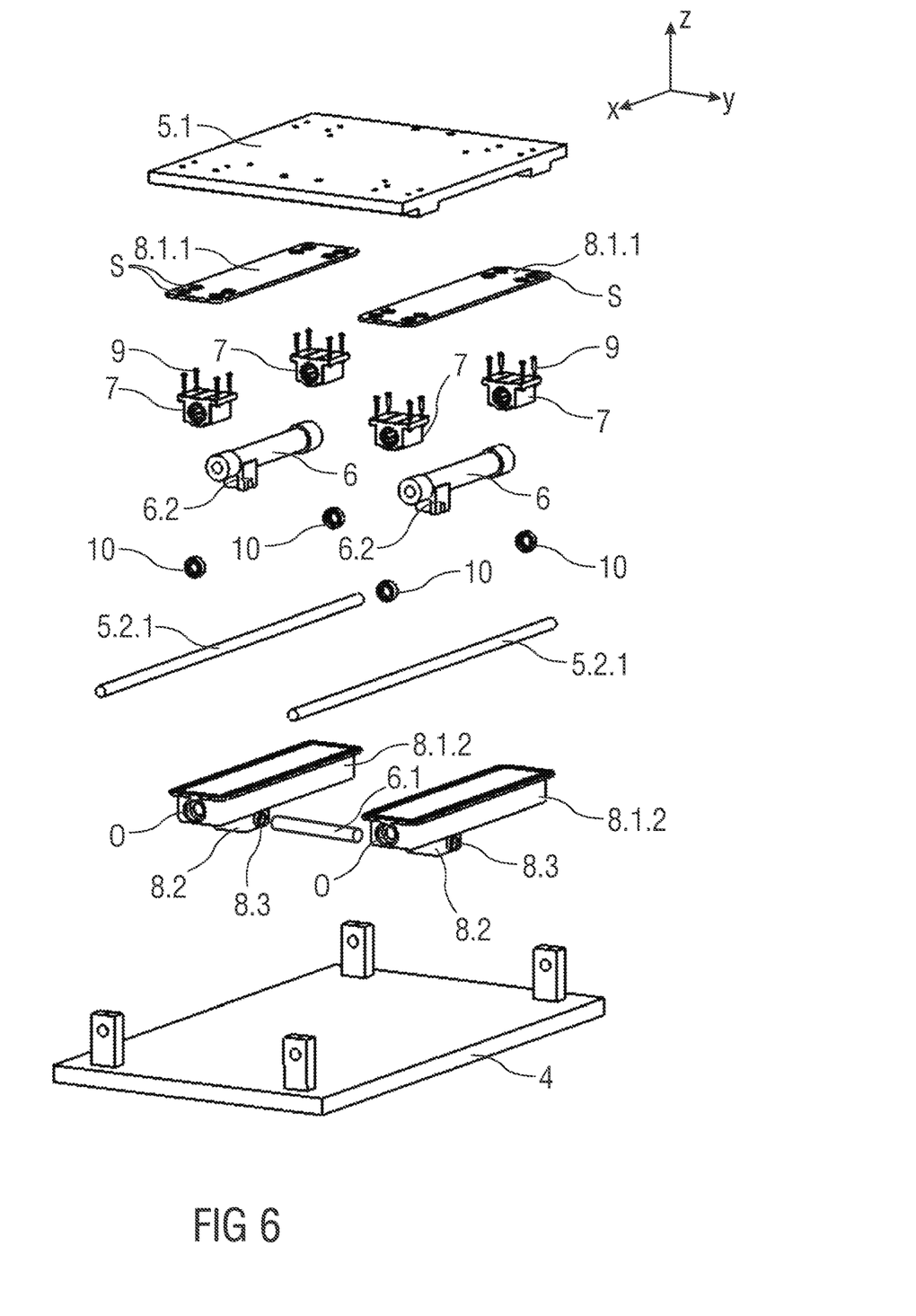
FIG. 6 shows an exploded view of an exemplary embodiment of a seat track.

FIG. 5 shows a perspective view of an exemplary embodiment of the seat track 5 comprising the lock mechanism L and the safety device 8. FIG. 6 shows an exploded view of the seat track 5.

The safety device 8 comprises a housing 8.1 containing the lock mechanism L including the lock device 6 and the bearing 7. The housing 8 may be made from a resistant material, such as stainless metal or rigid plastic.

Referring to FIG. 6, the housing 8.1 is two-parted and comprises a cap shell 8.1.1 and a bottom shell 8.1.2 that are engaged to each other in interlocking and/or force-fitting manner. In an exemplary embodiment, the cap shell 8.1.1 is flat and comprises a number of slots S through which fixing elements 9, e. g. screws, are guided for releasing the lock mechanism L.

In an exemplary embodiment, the box shell 8.1.2 is shell-like and comprises further openings O, in particular two openings O, each on one front end of the bottom shell 8.1.2 through which the track member 5.2.1 of the second track assembly 5.2 is guided. The bottom shell 8.1.2 comprises a further opening O on a side wall, through which a not shown Bowden element is guidable in order to release the lock mechanism L.

All openings O are sealed with sealing elements 10. The slots S may be sealed as well. In an exemplary embodiment, the sealing elements 10 are circular shaped. In particular, the sealing elements 10 are O-rings. Furthermore, the sealing elements 10 sealing the openings O in the bottom shell 8.1.2 are configured to wipe away any mud or debris on the track member 5.2.1 when the seat 1 is adjusted fore and/or aft.

Figure 8:
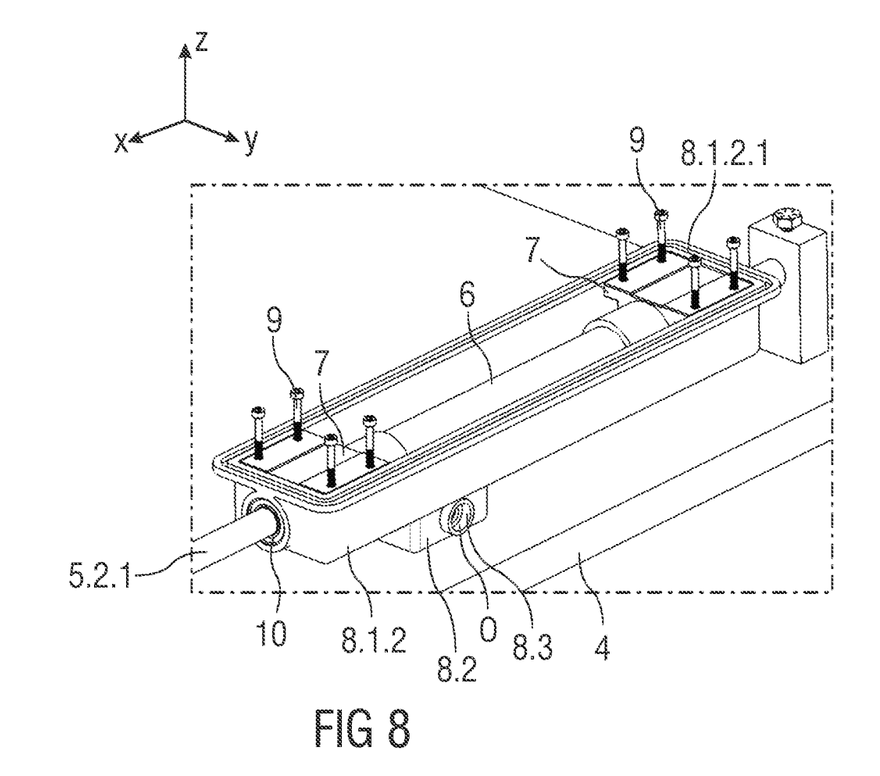
FIG. 8 shows a perspective view of an enlarged section with an exemplary embodiment of a lock mechanism of a seat and a box shell of a safety device.

The housing 8.1 further comprises a circumferential sealing 11 (see FIG. 11), which is inserted between circumferential grooves 8.1.1.1, 8.1.2.1 arranged circumferentially on the edge of the cap shell 8.1.1 and the bottom shell 8.1.2 (see FIG. 8). Hence, the cap shell 8.1.1 may seal the bottom shell 8.1.2 and the bottom shell 8.1.2 may seal the lock device 6 and the bearings 7.

Figure 7:
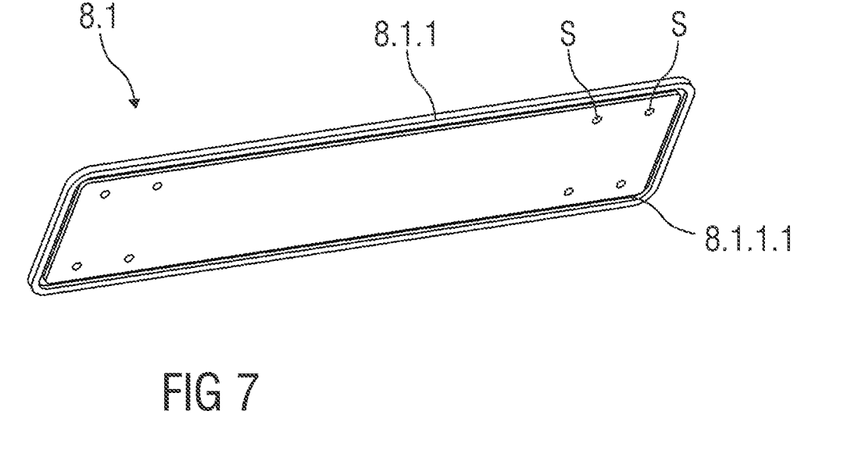
FIG. 7 shows a perspective view of an exemplary embodiment of a cap shell of a safety device.

FIG. 7 shows a perspective view of an exemplary embodiment of the cap shell 8.1.1 of the safety device 8. The cap shell 8.1.1 is configured as a flat plate.

FIG. 8 shows a perspective view of an enlarged section with an exemplary embodiment the box shell 8.1.2 and the lock device 6. The cap shell 8.1.1 is not shown.

Figure 9A:
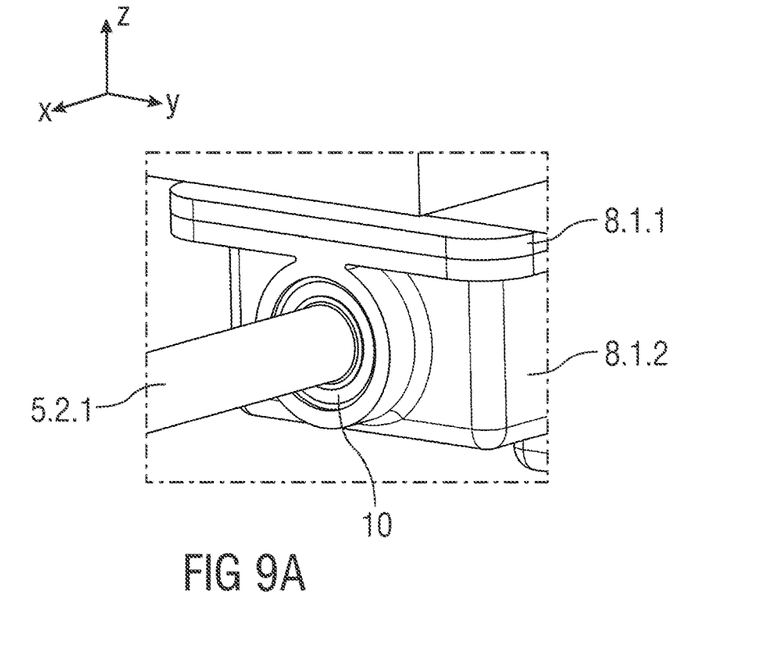
FIG. 9A shows a perspective view of an enlarged section with a seat rod guided through an opening of the safety device.
Figure 9B:
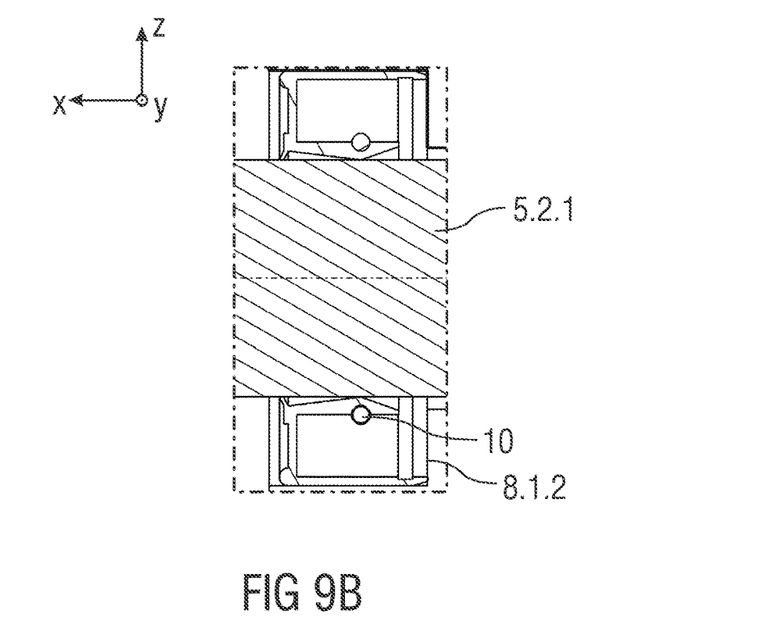
FIG. 9B shows a cut view of FIG. 9A.

FIG. 9A shows a perspective view of an enlarged section with the track member 5.2.1 guided through an opening O of the box shell 8.1.2. FIG. 9B shows a cut view of FIG. 9A.

FIG. 10 shows a cut view of an exemplary embodiment of the seat track 5 comprising the lock mechanism and the safety device 8.

Figure 11:
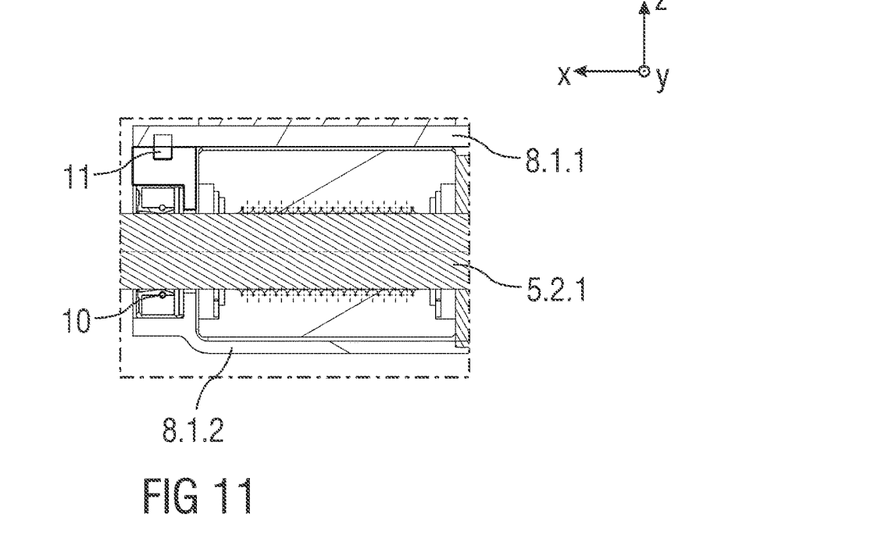

FIG. 11 shows a cut view of an enlarged section of FIG. 10 with the track member 5.2.1 guided through an opening O of the bottom shell 8.1.2.

The exemplary embodiments show dual linear lock mechanisms L. The disclosure is not limited to this. There may be a single sided lock mechanism L that locks on one side of the seat track 5. The other side comprises just linear bearings 7 that may be sealed by a safety device 8 with smaller dimensions.

This lock mechanism L could be released manual with bowden cables or using mechatronics. Furthermore, the safety device 8 is not limited to be used for a lock mechanism L of a seat track 5. The safety device 8 may be also used for a lock mechanism of a recliner (not shown). Here, linear bearings would not be required since less occupant mass would be applied to the backrest 3. A return spring would be required to bring the backrest back to an upright position though. The safety device 8 could also be configured with smaller dimensions. Moreover, the safety device may be used for any lock mechanism that is required to be protected from outside elements to maintain functionality. Hence, the safety device 8 is not limited to be used in vehicles.

LIST OF REFERENCES 1 seat
2 seat pan
3 backrest
4 seat base
5 seat track
5.1 first seat track assembly
5.1.1 track member
5.2 second seat track assembly
5.2.1 track member
6 lock device
6.1 transmission component
6.2 coupling component
7 bearing
8 safety device
8.1 housing
8.1.1 cap shell
8.1.1.1 groove
8.1.2 bottom shell
8.1.2.1 groove
8.2 housing part
8.3 exit
9 fixing elements
10 sealing element
11 circumferential sealing
L lock mechanism
O opening
S slot
x longitudinal axis
y transverse axis
z vertical axis

The invention claimed is:

1. A safety device for a lock mechanism, comprising:
a sealed housing that encapsulates the lock mechanism,
wherein the lock mechanism comprises at least one lock device contained in the sealed housing, said lock mechanism adapted for manual adjustment,
wherein the housing comprises at least one opening, through which at least one adjustment element coupled to the lock device is guidable and
wherein the at least one opening comprises a sealing element arranged in the opening on an end side of the lock device.

2. The safety device according to claim 1, wherein the housing comprises at least a cap shell and a bottom shell engaged to each other in an interlocking or force-fitting manner.

3. The safety device according to claim 2, wherein an engaging area between the cap shell and bottom shell is sealed by a circumferential sealing.

4. The safety device according to claim 3, wherein the cap shell and bottom each comprise a circumferential groove on their edge configured to receive the circumferential sealing.

5. The safety device according to claim 4, wherein the cap shell is configured as a cover and comprises a number of slots through which fixing elements of the lock mechanism are guidable.

6. The safety device according to claim 2, wherein the bottom shell comprises the at least one opening.

7. The safety device according to claim 2, wherein the bottom shell comprises a further opening on a side wall, through which a releasing element configured to release the lock mechanism is guidable.

8. The safety device according to claim 1, wherein the housing comprises further openings which are respectively sealed by sealing elements.

9. The safety device according to claim 1, wherein the sealing element is a seal ring.

10. The safety device according to claim 1, wherein the housing is made from a stainless metal.

11. A seat track for a seat, comprising:
a first track assembly with at least one track member,
a second track assembly with at least one further track member,
a lock mechanism configured to lock an adjustment of the seat,
wherein the lock mechanism comprises at least one lock device contained in a sealed housing that encapsulates the lock mechanism, said lock mechanism adapted for manual adjustment, wherein the housing comprises at least one opening, through which at least one adjustment element coupled to the lock device is guidable and wherein the at least one opening comprises a sealing element arranged in the opening on an end side of the lock device.

12. The seat track according to claim 11, wherein the lock mechanism comprises at least one bearing element each contained in the housing.

13. The seat track according to claim 11, wherein the track member of the second seat track assembly is configured as a rod that is guided through the at least one opening in the housing.

* * * * *